(12) United States Patent
Wescombe-Down

(10) Patent No.: US 7,412,944 B2
(45) Date of Patent: Aug. 19, 2008

(54) SHARK REPELLING FIELD GENERATING CORD

(75) Inventor: Michael Wescombe-Down, Glenelg North (AU)

(73) Assignee: SeaChange Technology Holdings Pty Ltd, South Australia (AU)

( * ) Notice: Subject to any disclaimer, the term of this patent is extended or adjusted under 35 U.S.C. 154(b) by 0 days.

(21) Appl. No.: 10/490,815

(22) PCT Filed: Sep. 23, 2002

(86) PCT No.: PCT/AU02/01297

§ 371 (c)(1),
(2), (4) Date: Sep. 8, 2004

(87) PCT Pub. No.: WO03/026410

PCT Pub. Date: Apr. 3, 2003

(65) Prior Publication Data

US 2005/0039692 A1 Feb. 24, 2005

(30) Foreign Application Priority Data

Sep. 25, 2001 (AU) .................................... PR 7902

(51) Int. Cl.
*A01K 61/00* (2006.01)
(52) U.S. Cl. ........................ 119/220; 119/719; 119/908; 340/852
(58) Field of Classification Search .................. 119/220, 119/719, 908, 9.6; 43/17.1, 9.6, 9.8; 231/7; 340/852
See application file for complete search history.

(56) References Cited

U.S. PATENT DOCUMENTS

| | | | | |
|---|---|---|---|---|
| 3,052,836 A | * | 9/1962 | Postma | 324/365 |
| 3,164,772 A | * | 1/1965 | Hicks, IV | 119/220 |
| 3,483,649 A | * | 12/1969 | Hightower et al. | 43/9.6 |
| 3,484,665 A | * | 12/1969 | Ormsby et al. | 361/232 |
| 3,491,474 A | * | 1/1970 | Metcalf, Jr. | 43/9.6 |
| 3,683,280 A | * | 8/1972 | Holt | 43/9.6 |
| 3,822,403 A | * | 7/1974 | Coleman et al. | 455/40 |
| 4,210,869 A | * | 7/1980 | Groenendyke et al. | 324/349 |
| 4,211,980 A | * | 7/1980 | Stowell | 455/40 |
| 4,298,840 A | * | 11/1981 | Bischoff et al. | 324/365 |
| 4,617,518 A | * | 10/1986 | Srnka | 324/365 |
| 4,667,431 A | * | 5/1987 | Mendicino | 43/6 |
| 4,750,451 A | * | 6/1988 | Smith | 119/220 |
| 4,917,280 A | * | 4/1990 | Schneider | 224/223 |
| 5,158,039 A | * | 10/1992 | Clark | 119/712 |
| 5,214,873 A | * | 6/1993 | Sharber | 43/17.1 |
| 5,417,006 A | | 5/1995 | Schettino | |
| 5,460,123 A | * | 10/1995 | Kolz | 119/220 |
| 5,468,167 A | * | 11/1995 | Givens | 441/40 |
| 5,566,643 A | * | 10/1996 | Charter et al. | 119/220 |

(Continued)

FOREIGN PATENT DOCUMENTS

JP 09140293 A * 6/1997

(Continued)

*Primary Examiner*—Yvonne R. Abbott
(74) *Attorney, Agent, or Firm*—Klauber & Jackson

(57) ABSTRACT

A cord having two electrodes for generating a shark-repelling electromagnetic field about a user. The cord is connected to a field generator supported by the user, and in use, maintains contact with surrounding water, even if the user is out of the water.

11 Claims, 3 Drawing Sheets

U.S. PATENT DOCUMENTS

| | | | | |
|---|---|---|---|---|
| 5,570,322 | A * | 10/1996 | Miller | 367/107 |
| 5,616,333 | A * | 4/1997 | Hayes | 424/402 |
| 5,732,501 | A * | 3/1998 | Ausburn | 43/5 |
| 6,236,211 | B1 * | 5/2001 | Wynn | 324/365 |
| 6,606,963 | B1 * | 8/2003 | Wynne | 119/220 |
| 6,837,182 | B2 * | 1/2005 | Leblanc | 119/220 |
| 2003/0233694 | A1 * | 12/2003 | Wescombe-Down | 2/2.15 |
| 2005/0000465 | A1 * | 1/2005 | Wescombe-Down | 119/220 |
| 2005/0064774 | A1 * | 3/2005 | Grune et al. | 441/74 |
| 2005/0197686 | A1 * | 9/2005 | Vlad | 607/149 |

FOREIGN PATENT DOCUMENTS

| | | | |
|---|---|---|---|
| WO | WO 96/37099 | | 11/1996 |
| ZA | 9308801 | A * | 9/1994 |

* cited by examiner

US 7,412,944 B2

SHARK REPELLING FIELD GENERATING CORD

TECHNICAL FIELD

This invention relates to devices and applications for generating electric fields about a swimmer.

BACKGROUND TO THE INVENTION

Numerous devices are known for the purpose of repelling aquatic creatures. The majority of these devices are designed to generate an electromagnetic field in close proximity of a diver or to form a barrier or boundary in the nearby water.

Most studies are conducted on the aquatic creature subgroup of elasmobranchii, otherwise known as sharks. Most shark repelling apparatus use electromagnetic pulses, delivered into the water by submerged antenna or electrodes, to create an appropriate electromagnetic field in the vicinity of the diver.

Various types of pulse generators are used, the characteristics of which include a specification of its duration, repetition rate, amplitude and a pulse rise time. The value or ranges of each characteristic are carefully selected so as to create the electromagnetic field deemed most effective.

In the past, such field generators have been disposed on the body of the swimmer. For example, a field generator unit might be attached to scuba equipment of a diver which would produce a shark repelling zone about the diver. While generally effective, this arrangement suffers from a number of disadvantages particularly, if the swimmer is not otherwise encumbered by other apparatus or if the swimmer is for example engaging in surfing and is not continually in the water. This will result in the protective field being absent for a proportion of time, and thus reducing its effectiveness.

It is an object of the present invention to provide a device which may be used effectively by swimmers and those who spend a proportion of their time outside of the water, such as surfers, when standing on a surfboard.

SUMMARY OF THE INVENTION

According to a first aspect of the present invention, there is provided a cord supporting two electrodes for generating an electromagnetic field about a user to repel selected aquatic creatures, when in use, the cord and electrodes are connected to an electromagnetic field generator and the supported electrodes are able to make contact with surrounding water even if the user is not in contact with the water and wherein the electrodes are disposed substantially parallel to the cord.

Preferably, the distance between the two electrodes may be varied. The electrodes may be retrofitted to the cord, or may be incorporated within the cord.

A first end of the cord may be connected to the electromagnetic field generator which may be housed in an ankle cuff worn by the user.

The second end of the cord may be left free, or may alternatively, be adapted to be attached to a surfboard.

Preferably, the cord is made from elastomeric material.

The cord is preferably, in use, connected to the electromagnetic field generator in the ankle cuff via a resilient flexible protrusion extending from the ankle cuff.

According to a second aspect of the present invention, there is provided a method of providing a shark-free region about a user, the method including supporting two electrodes an a cord connected at one end, to a shark-repelling electromagnetic field generator supported by the user, such that the supported electrodes are able to make contact with surrounding water even if the user is not in contact with the water and wherein the electrodes are disposed substantially parallel to the cord.

Preferably, the shark-repelling electromagnetic field generator is supported by the user in an ankle cuff worn about the user's ankle.

BRIEF DESCRIPTION OF THE DRAWINGS

The invention will now be described in more detail with reference to the following figures in which.

DETAILED DESCRIPTION OF THE PREFERRED EMBODIMENTS

Figure 1:
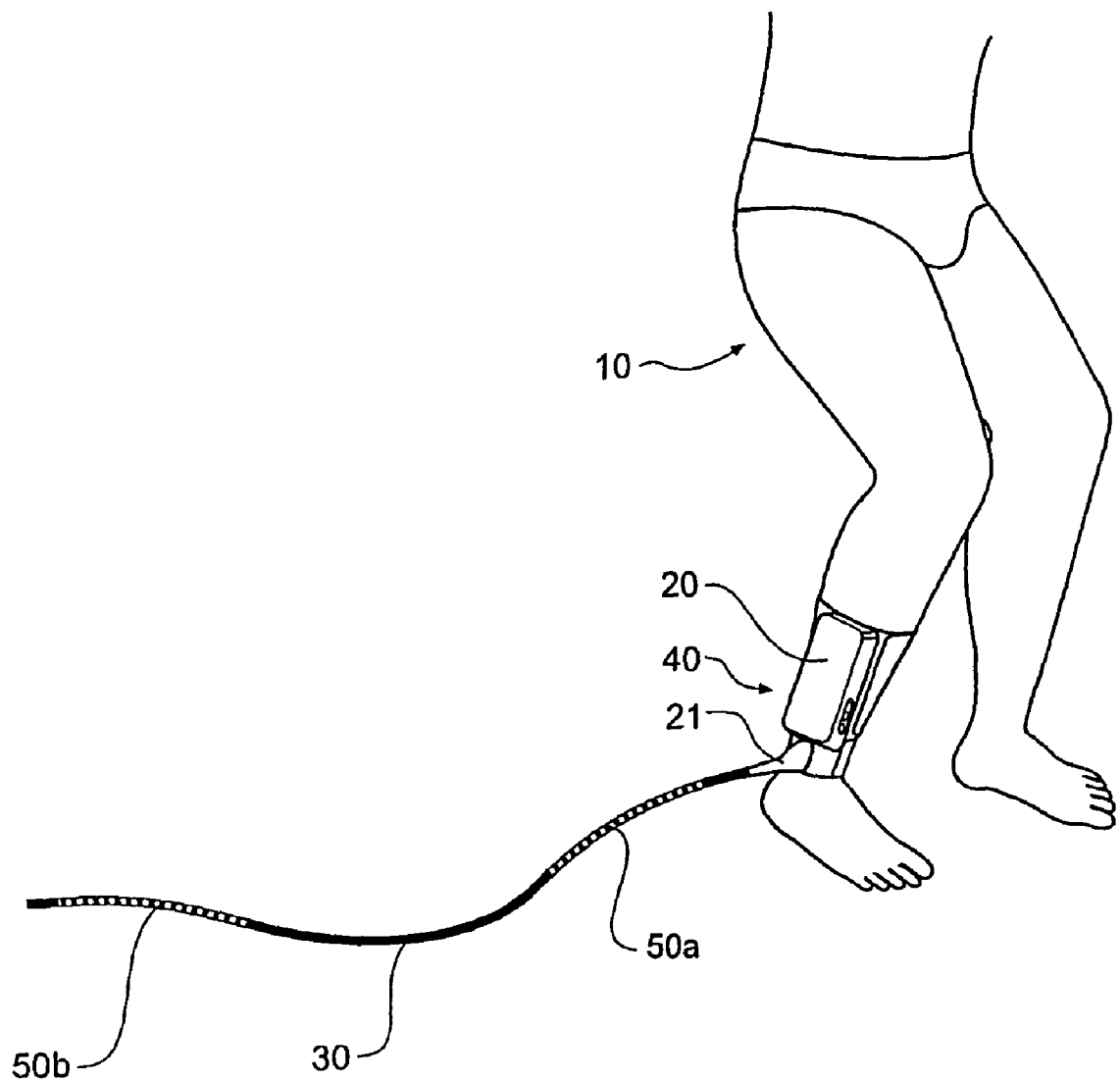
FIG. 1 shows the legs of a swimmer wearing the device of the present invention.

FIG. 1 shows the legs of a swimmer 10 wearing a cuff 20 about one leg to which is attached cord 30. The end of the cord 30 distal to the swimmer 10 may be left free, or if the swimmer 10 is surfing, the end may be attached to a surfboard (not shown in FIG. 1). If left free, cord 30 will simply trail behind swimmer 10, and generate a shark-free zone about the swimmer.

Supported by cuff 20 is a standard electromagnetic field generator 40 which is also electrically connected to cord 30. Of course, it will be understood that field generator 40 may be supported at any other convenient place on the user, such as the hip or the upper thigh. A suitable field generator may be such as described in Australian Patent Number 669806, to Natal Sharks Board.

Supported by cord 30, are two electrodes 50*a* and 50*b* which upon stimulation by electromagnetic field generator 40, emit an electromagnetic field therebetween (not shown).

Figure 2:
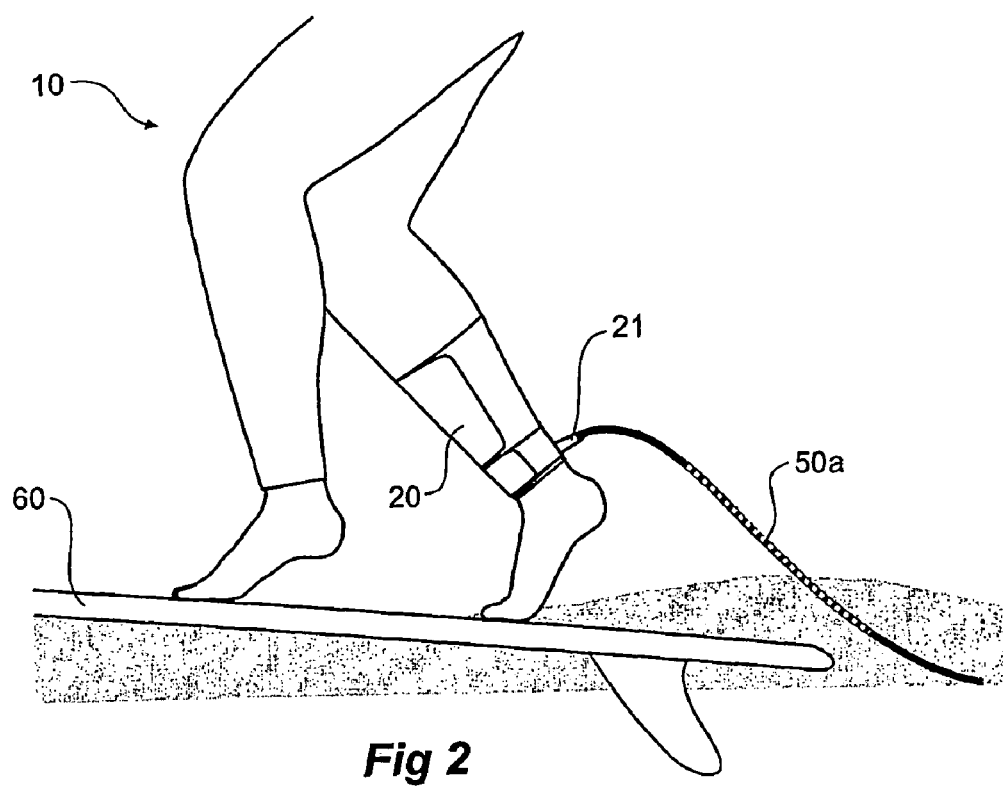
FIG. 2 shows a surfer wearing the device of the present invention standing upright on a surfboard.

Cuff 20 is made from a flexible non-conductive and non-slip synthetic material which may be wrapped around and attached to the leg of the swimmer 10 in any known conventional manner, including straps with Velcro or buckles. Extending from the surface of cuff 20, is a resilient flexible protrusion 21 as shown in more detail in FIG. 2. Flexible protrusion 21 acts as a shock absorbing device and allows the elastomeric cord 30 to clear the particular part of the body or limb to which it is attached.

Electrodes 50*a* and 50*b* are made from a conductive material and may be fabricated in the form of flexible coil springs or as a woven braid. The electrodes may form co-axial slip-on covers that may be fitted over the elastomer cord 30 and could, if desired, slide freely along its length until required to be fixed in spaced relationship with each other. The electrodes will be of a nominated length and may be set a prescribed distance apart, depending upon the desired strength of the electromagnetic field. Typically however, the distance between the centres of the two electrodes 50*a* and 50*b* would be in the order of 800 mm to 900 mm.

It will be understood by the person skilled in the art that the electrodes need not be formed to be strictly co-axial with cord 30. For example, electrodes 50*a* and 50*b* may be attached to cord 30 by other means and allowed to run parallel to and slightly distanced from cord 30. Alternatively, electrodes 50*a* and 50b may be built within cord 30 co-axial with or otherwise upon manufacture of the cord if desired.

Each electrode 50a, 50b is electrically connected to generator 40 by a respective conductive wire, either externally or internally of the cord 30. This may be accomplished by any suitable means as would be known to the person skilled in the art.

In use, the elastomeric cord 30 is worn by swimmer 10 by attachment to cuff 20 at one end of cord 30 and attached to the surfboard 60 (FIG. 2) at the other end of the cord 30, as is conventional practice. In this way, surfers may retain their board in circumstances where they are forced off the board and into the water. Cord 30 then allows the swimmer 10 to easily regain their board and resume surfing.

According to the present invention, the cord 30 acts in the conventional manner but is also used as a propagating antenna for the shark repelling signal generator 40.

Figure 3:
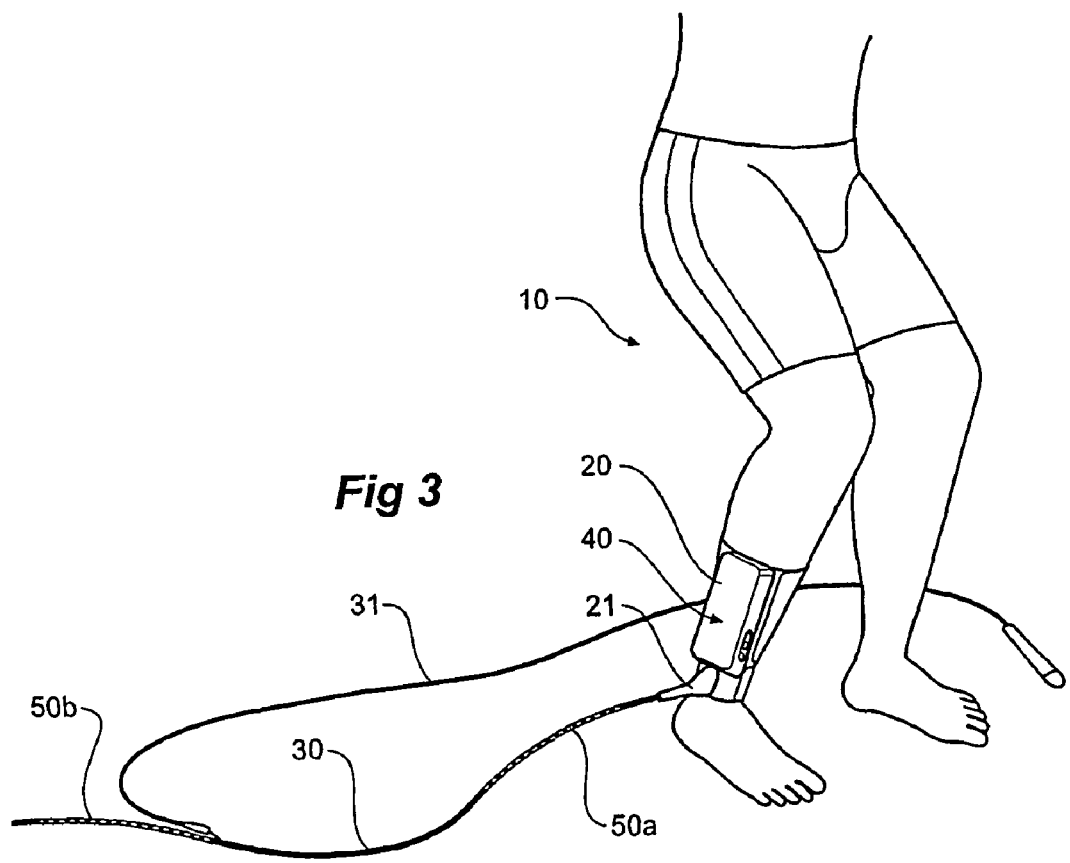
FIG. 3 shows a surfer wearing the device of the present invention.

An alternative embodiment is shown in FIG. 3, in which a conventional surfing leash 31 is attached to cord 30 as a separate unit.

Figure 4:
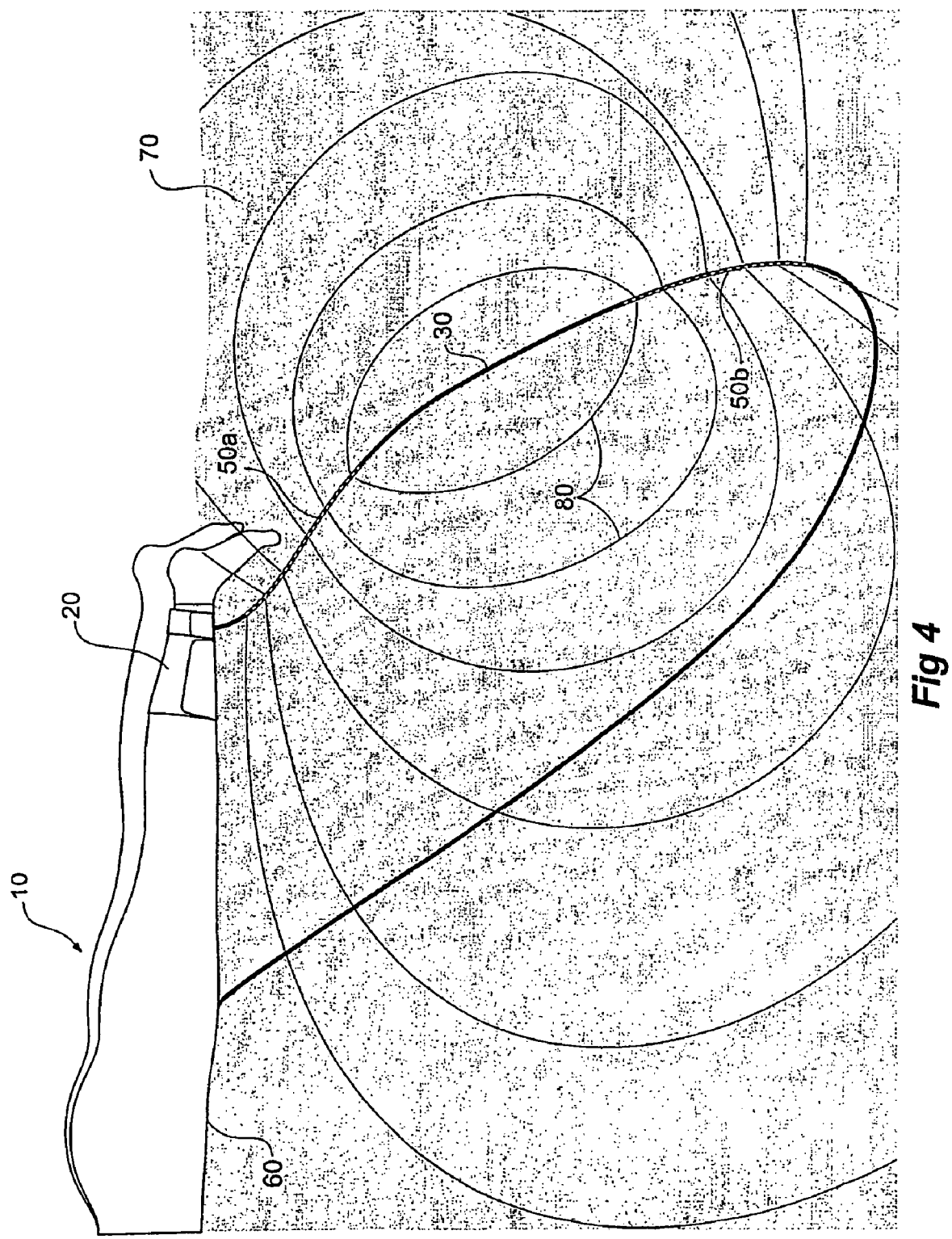
FIG. 4 shows the surfer wearing the device of the present invention and lying on a surfboard.

The present invention provides a further advantage in that it enhances the electromagnetic field generated by always allowing "best effect" electrode contact with the water as cord 30 naturally hangs down below the water line and creates a protective zone underneath the board and extending out and around the swimmer 10 as shown in FIG. 4.

Whether lying on the board 60 or sitting on the board 60, cord 30 remains in the water 70 generating electromagnetic field 80 which follows the surfer the entire time the surfer is in or out of the water 70.

When a swimmer 10 stands on top of the wet surfboard 60, the body is excluded from the electrical path created by the electrodes and the wearer feels no annoying skin stimulus. This lack of stimulus also applies when a surfer is lying or sitting on the board. Flexible protrusion 21 also aids to guide cord 30 away from swimmer 10 and particularly from the space between the swimmer's feet and the surfboard 60.

The above has been described with reference to a particular embodiment and it will be understood by the person skilled in the art that various modifications and additions may be made within the scope of the present invention.

The claims defining the invention are as follows:

1. A cord supporting a first electrode extending along and substantially parallel to a length of the cord and a second electrode extending along and substantially parallel to a further length of the cord, the first and second electrodes being separated by a portion of the cord, wherein in use, the first electrode and the second electrode generate an electromagnetic field about a user to repel selected aquatic creatures, and the first and second electrodes being connected to an electromagnetic field generator, and a first end of the cord is connected to an ankle cuff worn by the user.

2. A cord according to claim 1 wherein a second end of the cord is left free.

3. A cord according to claim 1 wherein a second end of the cord is adapted to be attached to a surfboard.

4. A cord according to claim 1 wherein the first electrode and the second electrode are retrofitted to the cord.

5. A cord according to claim 1 wherein the first electrode and the second electrode are incorporated within the cord.

6. A cord according to claim 1 wherein the cord is made of an elastomeric material.

7. A cord according to claim 1 wherein, in use, the cord is connected to the ankle cuff via a resilient flexible protrusion extending from the ankle cuff.

8. A cord according to claim 7 wherein the ankle cuff houses the electromagnetic field generator.

9. A cord according to claim 1 wherein the selected aquatic creature is a shark.

10. A cord according to claim 1 wherein the first electrode and the second electrode are slip-on covers disposed substantially coaxially along the cord.

11. A cord according to claim 1 wherein the distance between the first electrode and the second electrode may be varied.

* * * * *